US010850394B2

(12) United States Patent
Ishii et al.

(10) Patent No.: US 10,850,394 B2
(45) Date of Patent: Dec. 1, 2020

(54) DRIVING DEVICE

(71) Applicant: CASIO COMPUTER CO., LTD., Tokyo (JP)

(72) Inventors: Katsunori Ishii, Fussa (JP); Tamotsu Hashikami, Hamura (JP); Hiroyoshi Ogawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 40 days.

(21) Appl. No.: 16/212,176

(22) Filed: Dec. 6, 2018

(65) Prior Publication Data
US 2019/0193266 A1 Jun. 27, 2019

(30) Foreign Application Priority Data
Dec. 22, 2017 (JP) ................. 2017-246664

(51) Int. Cl.
*G06K 15/02* (2006.01)
*B25J 9/16* (2006.01)
*B25J 9/00* (2006.01)
*G05B 19/4155* (2006.01)

(52) U.S. Cl.
CPC ........... *B25J 9/1664* (2013.01); *B25J 9/0009* (2013.01); *B25J 9/1692* (2013.01); *G05B 19/4155* (2013.01); *G05B 2219/34013* (2013.01)

(58) Field of Classification Search
CPC ...... B25J 9/0009; B25J 9/1664; B25J 9/1692; G05B 19/4155; G05B 2219/34013
See application file for complete search history.

(56) References Cited

U.S. PATENT DOCUMENTS

| 10,476,353 B1* | 11/2019 | Tung ................... G05B 19/409 |
| 2009/0128080 A1* | 5/2009 | Cheng ............... G05B 19/0423 318/625 |
| 2018/0006595 A1* | 1/2018 | Huang ................... H02K 11/35 |
| 2019/0337159 A1 | 11/2019 | Tokuda |

FOREIGN PATENT DOCUMENTS

| JP | 9-062323 A | 3/1997 |
| JP | 2007-164577 A | 6/2007 |
| JP | 2010-118036 A | 5/2010 |
| JP | 2017-135961 A | 8/2017 |

OTHER PUBLICATIONS

JPO; Application No. 2017-246664; Notice of Reasons for Refusal dated Feb. 12, 2020.

* cited by examiner

*Primary Examiner* — Muhammad S Islam
(74) *Attorney, Agent, or Firm* — Fitch, Even, Tabin & Flanner LLP

(57) ABSTRACT

A controller includes a first transmission unit that transmits identification information designating one servo-motor from among the servo-motors, an operation detection unit that detects an operation aspect of the driving device that is caused by a movement of the drive section driven by the servo-motor which is operated by the drive controller based on the identification information transmitted by the first transmission unit, and a correspondence information generation unit that creates correspondence information indicating which servo-motor among the servo-motors the identification information transmitted by the first transmission unit corresponds to, based on the detected operation aspect.

13 Claims, 8 Drawing Sheets

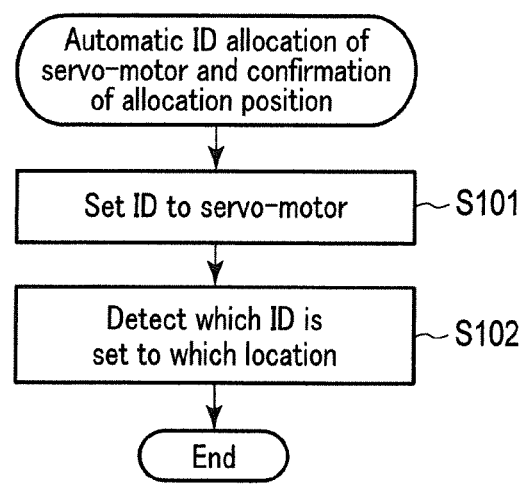
F I G. 3

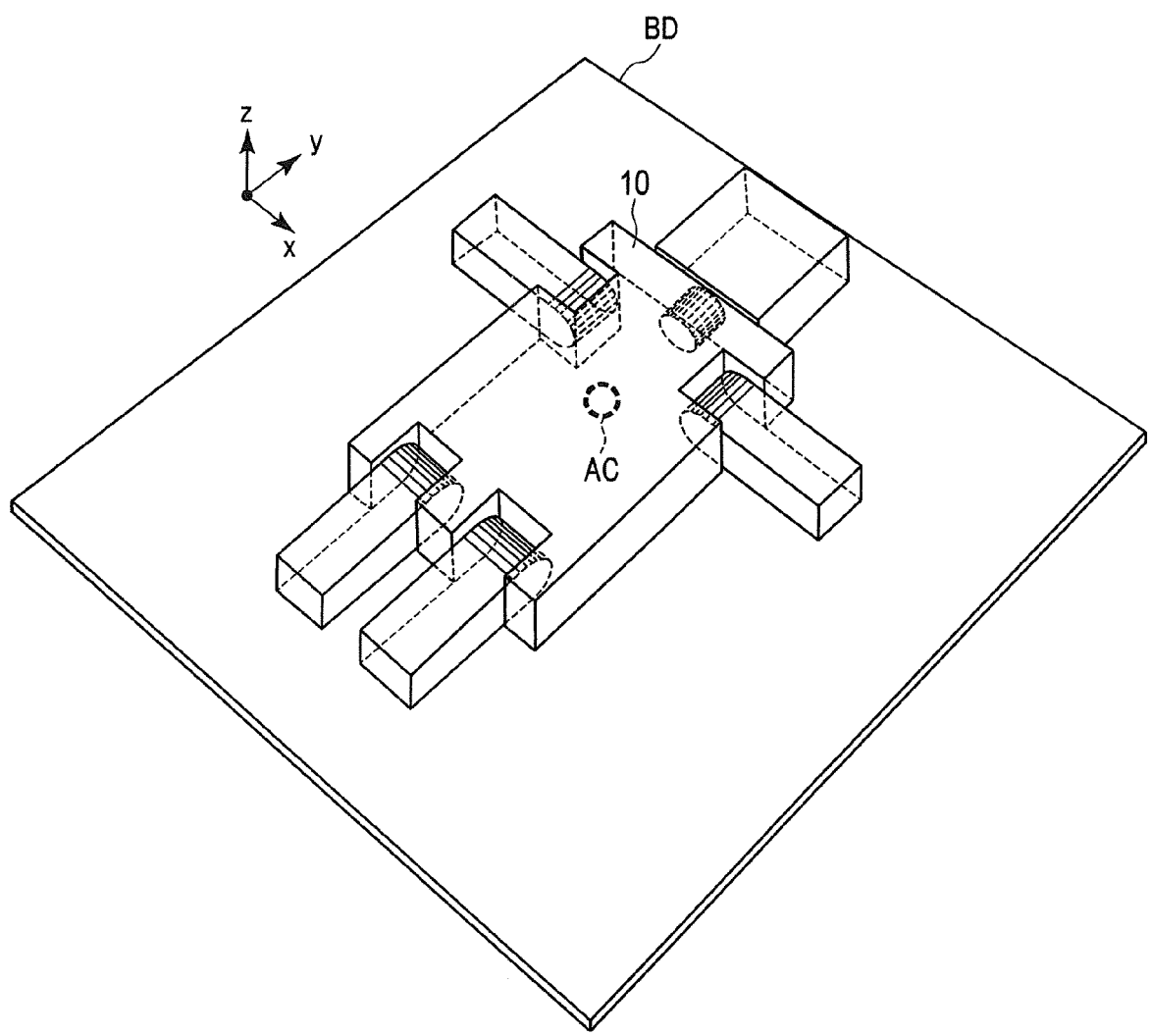
F I G. 8

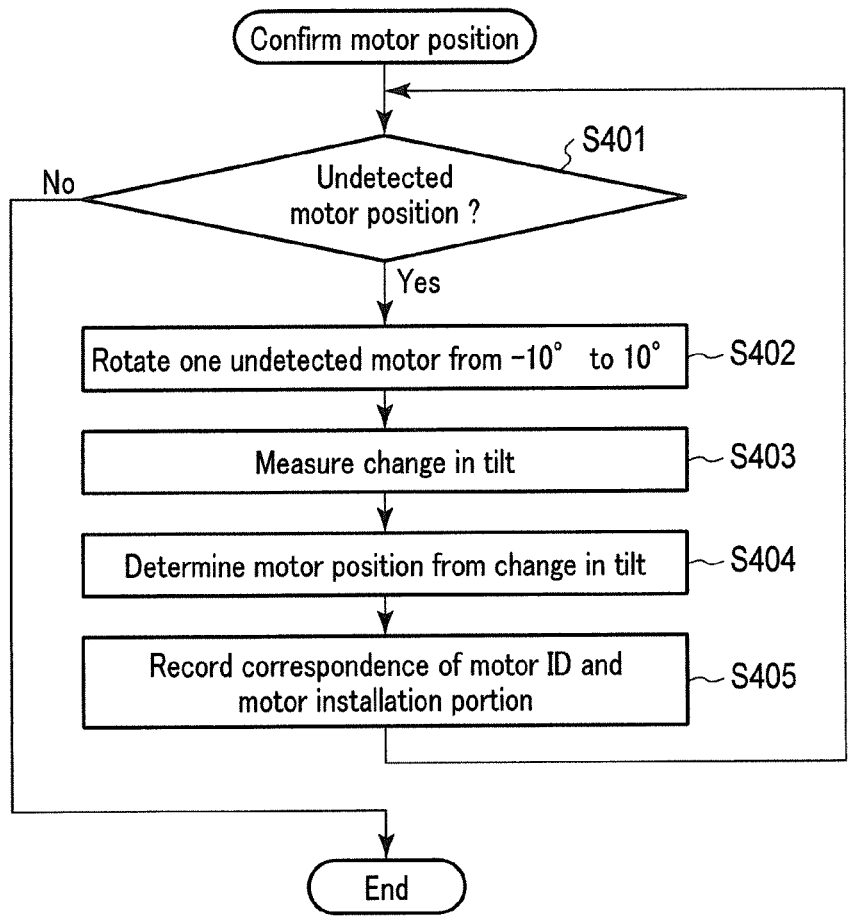
F I G. 9

DRIVING DEVICE

CROSS-REFERENCE TO RELATED APPLICATIONS

This application is based upon and claims the benefit of priority from Japanese Patent Application No. 2017-246664, filed Dec. 22, 2017, the entire contents of which are incorporated herein by reference.

BACKGROUND OF THE INVENTION

1. Field of the Invention

The present invention relates to a driving device suitable for use in robots, etc.

2. Description of the Related Art

For robots that operate by simulating some kind of living body, etc. by providing a servo-motor to each joint part, the number of servo-motors to be used for the entire robot increases. Therefore, it sometimes adopts a configuration in which a plurality of servo-motors are connected to a same signal line by using a serial communication interface of a universal asynchronous receiver/transmitter (UART), etc.

In this case, a signal from a controller that collectively controls all of the servo-motors is distributed as a same signal to each of the servo-motors on the same signal line. Each of the servo-motors stores unique ID information in a memory therein. By ID information added to the distributed signals, the servo-motors determine whether or not the transmitted signals are addressed to themselves.

Since the same ID information is allocated to the servo-motor in an initial state, the controller has to go through the process of connecting only one servo-motor to the signal line, rewriting the ID information on the servo-motor in a one-on-one state, where only one motor can be recognized by the controller, and repeating this process for the number of servo-motors to be used, which is a very troublesome process.

When actually setting the ID information on the servo-motor to be mounted on the robot, a method such as setting the ID information for each of the servo-motors, then assembling the robot, or, assembling the robot, then setting the ID information by removing the servo-motors one by one, and re-mounting them on their original positions, may be considered. However, in any case, the process is very troublesome.

Also, in the field of a numerical value controller, in order to avoid the same troublesome process, a technique of automating as much as possible a parameter setting that occurs upon start-up of the device, preventing a setting error even in a case where a user must perform the setting, and realizing a control to be performed at a short time, is suggested. (See, for example, Jpn. Pat. Appln. KOKAI Publication No. 9-062323.)

SUMMARY OF THE INVENTION

According to one aspect of the present invention, there is provided a driving device comprising: a controller; a plurality of servo-motors connected to the controller through a common signal line; and a plurality of drive sections driven by the servo-motors, respectively, wherein each of the servo-motors includes: a first storage section storing identification information that differ from each other; and a drive controller that causes the servo-motor to operate in a case where identification information transmitted to the common signal line by the controller and the identification information stored in the first storage section match, and wherein the controller includes: a first transmission unit that transmits identification information designating one servo-motor from among the servo-motors to the common signal line; an operation detection unit that detects an operation aspect of the driving device that is caused by a movement of the drive section driven by the servo-motor, among the servo-motors, which is operated by the drive controller based on the identification information transmitted by the first transmission unit to the common signal line; and a correspondence information generation unit that creates correspondence information indicating which servo-motor among the servo-motors the identification information transmitted by the first transmission unit corresponds to, based on the operation aspect detected by the operation detection unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a flow chart showing an entire processing flow according to the embodiment;

FIG. 8 is a perspective view showing a case in which the robot according to the embodiment is placed on a desk board BD on its back; and FIG. 9 is a flowchart showing processing content of a registration setting corresponded to an ID code upon part registration according to the embodiment.

DETAILED DESCRIPTION OF THE INVENTION

In the following, an embodiment of a case in which the present invention is applied to a human-type robot will be explained with reference to the accompanying drawings.

Figure 1:
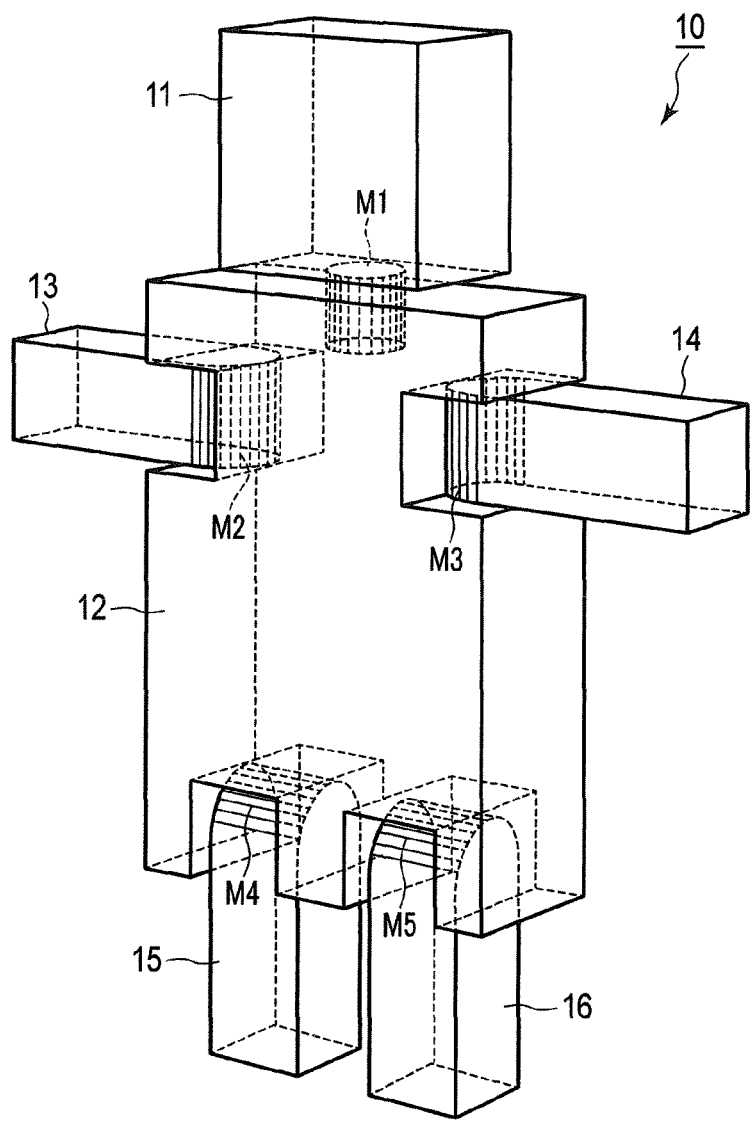
FIG. 1 is a perspective view showing an appearance configuration of a robot according to an embodiment of a present invention.

FIG. 1 is a perspective view showing an appearance configuration of a robot 10 according to the present embodiment. In the drawing, each of a head part 11 (drive section), a right hand part 13 (drive section), a left hand part 14 (drive section), a right leg part 15 (drive section), and a left leg part 16 (drive section) is rotatably attached to a torso part 12, and is made to operate as appropriate so that each attached angle varies with respect to the torso part 12 by each servo-motor M1 to M5 arranged at each base part.

Each of the servo-motors M1 to M5 is configured as a module specifically including a motor, a driver circuit (drive controller) thereof, a memory (first storage section <not shown>) for storing an ID code of the corresponding servo-motor, and a microcomputer (functioning as an identification information generation unit, a first storage controller, and a second transmission unit (not shown)) that generates the ID code, stores the generated ID code in the memory (first storage section), and transmits the ID code to a controller 21 through a serial bus SB (common signal line), each of which will be explained later.

Figure 2:
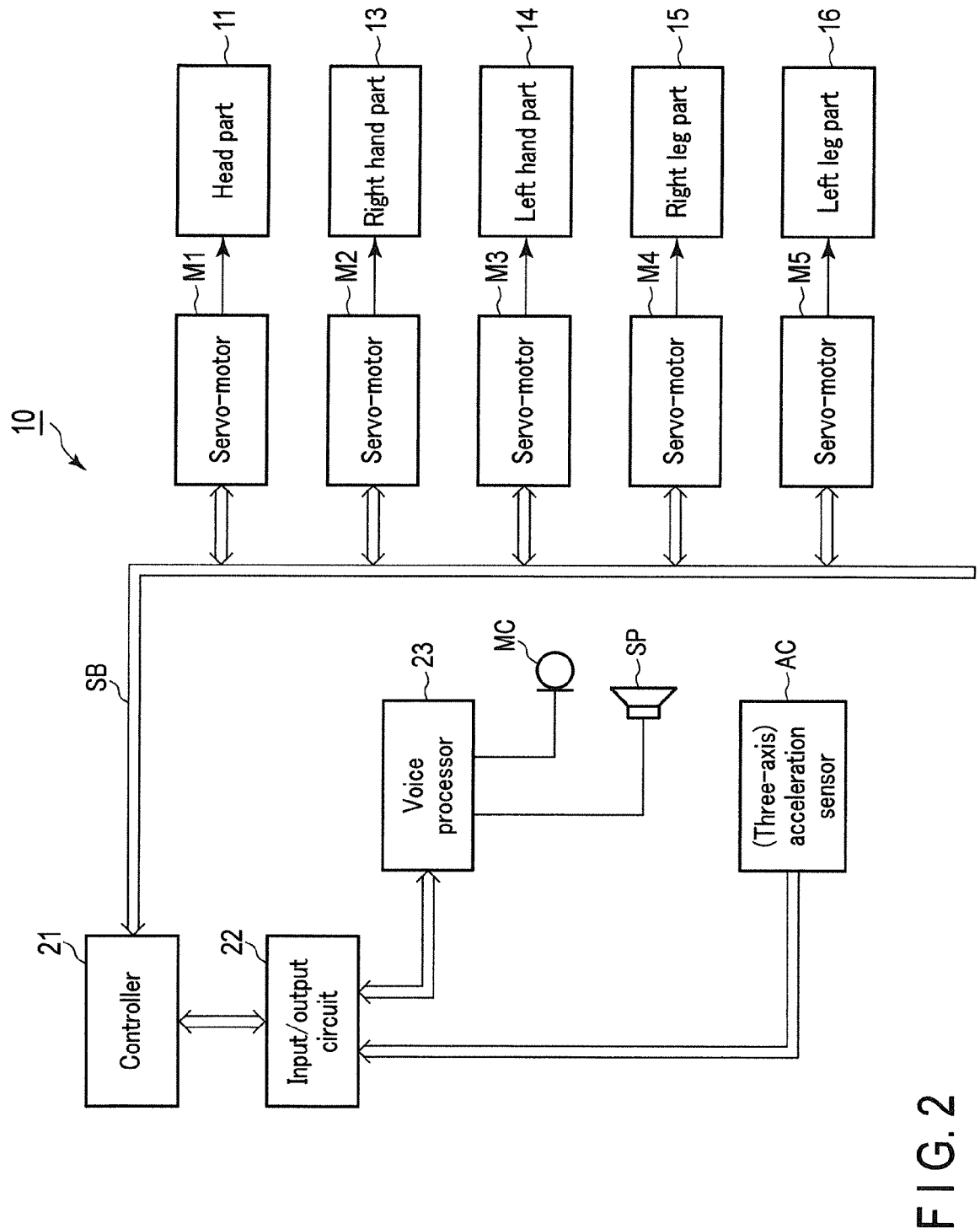
FIG. 2 is a block diagram showing a functional configuration of electronic circuits according to the embodiment.

FIG. 2 is a block diagram showing a functional configuration of electronic circuits provided in the robot 10. The servo-motors M1 to M5 are connected via a serial bus SB (common signal line) using UART, centering around a controller 21. The controller 21 is also connected to an input/output circuit 22. A voice processor 23 and an acceleration sensor AC are connected to the input/output circuit 22.

The voice processor 23 connects a microphone MC and a speaker SP, applies digital coding to an analog voice signal input from the microphone MC, and transmits it to the controller 21 through the input/output circuit 22. The voice processor 23, for example, includes a PCM sound source circuit to convert digital voice data provided from the controller 21 through the input/output circuit 22 into an analog voice signal, and amplifies and outputs it by the speaker SP.

The acceleration sensor AC is arranged at the center of the torso part 12, and is configured by, for example, a three-axis acceleration sensor and a detection circuit thereof. This acceleration sensor AC is used to detect the behavior of the torso part 12 and the posture of the entire robot 10 at that point, from acceleration information of a three-axis direction that is orthogonal to each other including gravity acceleration, at the torso part 12.

The controller 21 is configured by, for example, a chip of a micro-computer. The controller 21 includes a CPU, a RAM that is a work memory (second storage section), and a nonvolatile flash memory that stores an operation program and various types of fixed data, etc., and collectively controls the operation of the robot 10. There may be provided a non-transitory computer-readable storage medium having the program stored thereon which controls the controller 21 as a computer to perform control.

In order to simplify the explanation, in the present embodiment, each drive section of the head part 11, the right hand part 13, the left hand part 14, the right leg part 15, and the left leg part 16 is set as having only five-axis flexibility. Since a pet-type robot and a human-type robot that are actually commercialized have up to approximately 20 to 30-axis flexibility, it is not practical to connect the servo-motors provided on each drive section in parallel to the controller 21. Therefore, as in the manner mentioned above, the servo-motors are uniformly connected to the serial bus SB. A memory (first storage section) for storing an ID code of the motor is embedded in each driver circuit of the servo-motors M1 to M5.

An operation of the above embodiment is explained below.

FIG. 3 shows a flow of the entire processing upon initial setting by the controller 21, which is largely divided into two stages. In a first stage, an ID code is automatically set to all of the servo-motors M1 to M5 (step S101). In a second stage, each of the servo-motors M1 to M5 is detected as to which part of the robot it corresponds to based on the set ID code, and information indicating the detected position is corresponded to the ID code of the motor and stored (step S102).

First of all, the processing of setting the ID code for each servo-motor Mx (x: one of 1, 2, . . . , 5) in the first stage will be explained.

Figure 4:
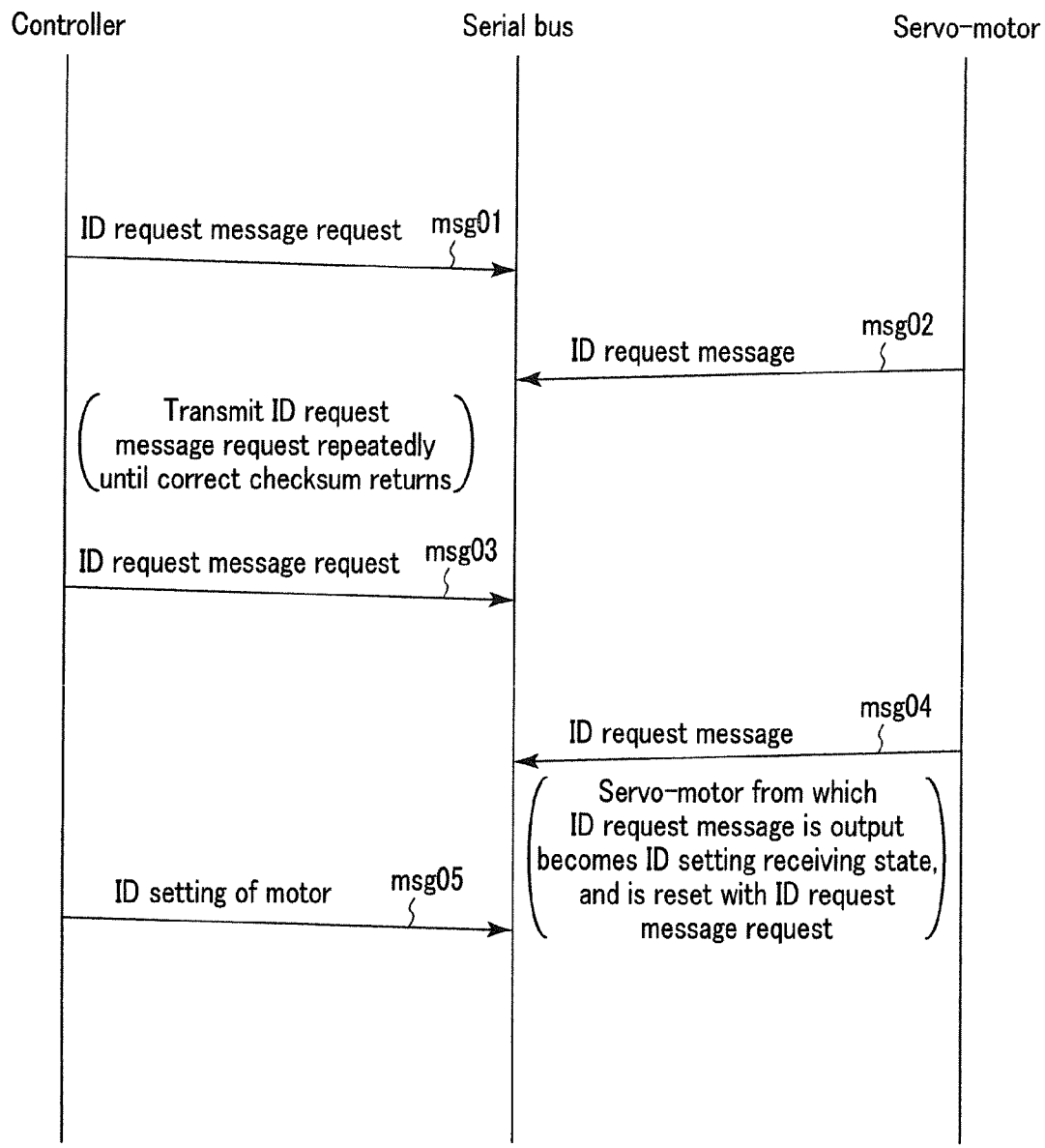
FIG. 4 is a sequence diagram showing communication content exchanged between a controller and a servo-motor, with a serial bus therebetween, upon setting an ID code according to the embodiment.

FIG. 4 is a sequence diagram showing communication content exchanged between the controller 21 and the servo-motors M1 to M5, with the serial bus SB therebetween, when setting the ID code. Data on the serial bus SB can be transmitted and received at both the controller 21 and the servo-motors M1 to M5.

At first, the controller 21 transmits an "ID request message request" to all of the servo-motors M1 to M5 through the serial bus SB (msg01).

The "ID request message request" is a request message for prompting the servo-motors M1 to M5 to transmit an "ID request message".

The servo-motor Mx that has received the message transmits the "ID request message" as a response (msg02). Here, whether or not to respond to the message is a matter randomly selected by each servo-motor Mx.

The servo-motor Mx that has transmitted the "ID request message" becomes a receiving state for the ID code setting. However, the receiving state will be reset when receiving the "ID request message request" again.

Figure 5:
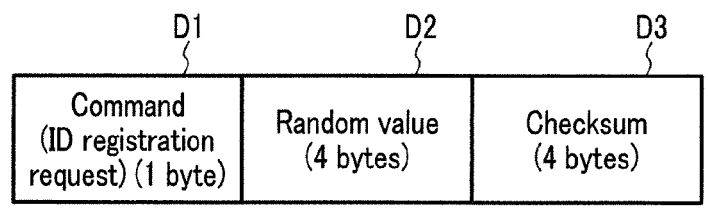
FIG. 5 shows a format of "ID request message" packet data according to the embodiment.

FIG. 5 shows a format of "ID request message" packet data that is transmitted by the servo-motor Mx. As shown in FIG. 5, one byte of ID registration request command data D1 is arranged at the head, and four bytes of random value D2 that has occurred is arranged subsequently. Four bytes of checksum D3 is arranged at the end, to configure the "ID request message" by a total of nine bytes.

In the case where two or more "ID request messages" above are transmitted on the serial bus SB; that is, in the case where a plurality of servo-motors simultaneously return the "ID request message", signals are mixed on the serial bus SB, and the above checksum does not become correct data. Therefore, the controller 21 repeats the transmission of the "ID request message request" until a correct checksum D3 is returned (msg03).

At a time when it is determined that there has been a response including a correct checksum D3 (msg04), the controller 21 determines that only one servo-motor Mx has returned the "ID request message" and is in the receiving state, and sets the ID code of the motor based on the received random value D2 in the data format (msg05).

By storing the ID code that has been transmitted on an inside memory, one servo-motor Mx in the receiving state completes setting the ID code.

In the same manner, the controller 21 waits for only one servo-motor Mx to transmit the "ID request message", and executes each ID code setting to the servo-motor Mx in order.

Figure 6:
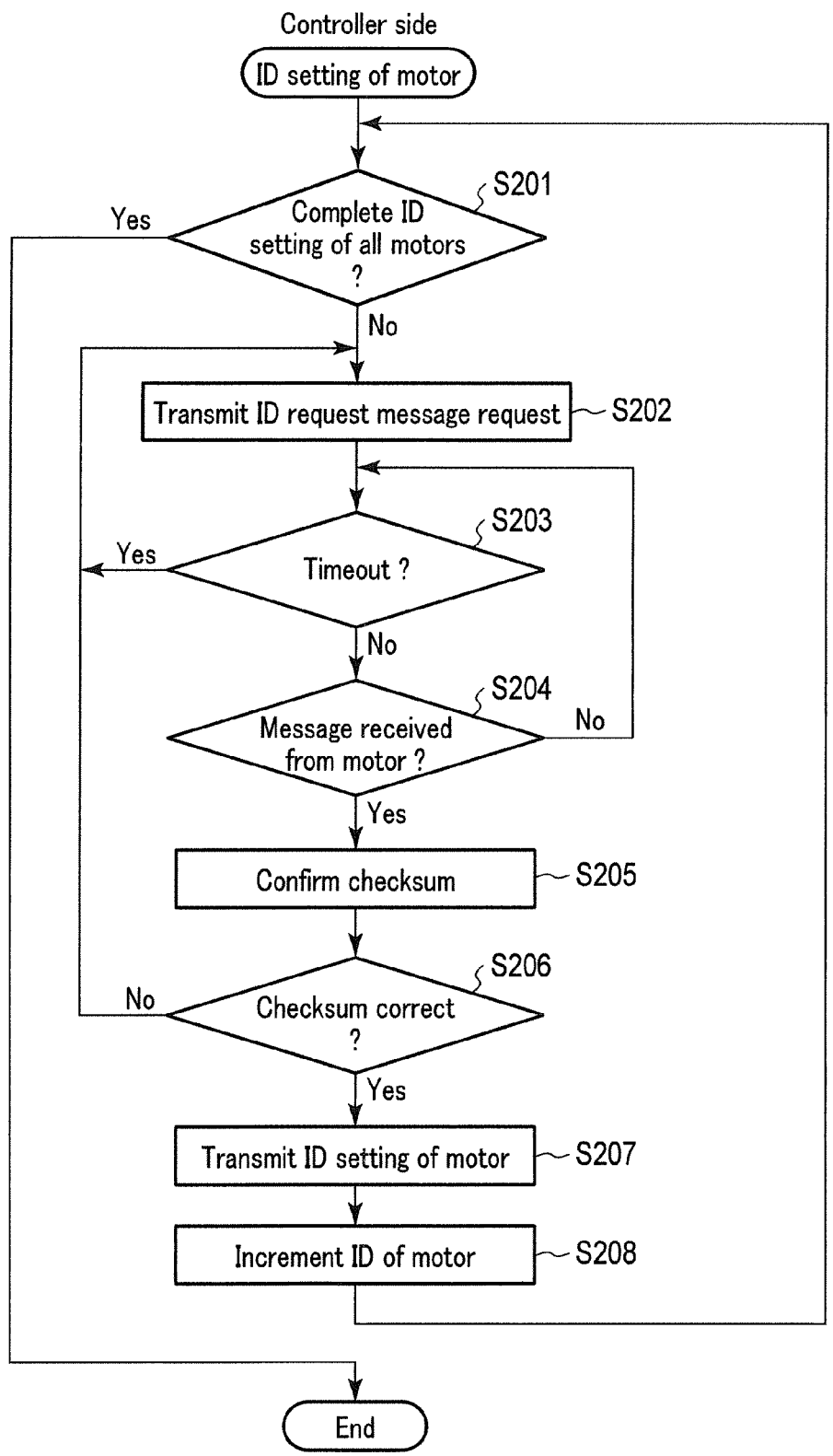
FIG. 6 is a flowchart showing processing content of the ID code setting at a controller side according to the embodiment.

FIG. 6 is a flowchart showing the processing content executed by the controller 21 side upon ID code setting. At first, the controller 21 confirms that the ID code setting has not been completed for all of the servo-motors M1 to M5 connected to the serial bus SB (step S201, No), and transmits the "ID request message request" to the serial bus SB (step S202).

Upon one transmission of the "ID request message request", the controller 21 repeatedly determines whether or not a preset time has lapsed and a timeout has been reached (step S203), and whether or not a message has been received from at least one of the servo-motors Mx (step S204), to shift to timeout, or to wait for reception of a message from the servo-motor Mx.

In step S203, in the case where timeout is determined (step S203, Yes), the controller 21 returns to the processing from step S202, and again transmits the "ID request message request" to the serial bus SB.

Furthermore, in step S204, in the case where it is determined that a message has been received from at least one servo-motor Mx (step S204, Yes), the controller 21 confirms the content of the checksum D3 shown in FIG. 5 in its message (step S205), and determines whether or not the content is correct (step S206).

In the case where the checksum D3 is determined as being incorrect (step S206, No), the controller 21 determines that the "ID request message" has been returned from a plurality of servo-motors, returns to the processing from step S202, and transmits the "ID request message request" again to the serial bus SB.

In step S206, in the case where it is determined that the content of the checksum D3 is correct, and that only one servo-motor Mx has returned the "ID request message" and is in the receiving state (step S206, Yes), the controller 21 transmits an ID code to be set to the servo-motor based on the random value D2 that is added before the checksum D3 (step S207).

Subsequently, after the controller 21 registers and sets the ID code that it holds at this point, and prepares for the next ID code setting of the servo-motor Mx (step S208), it returns to the processing of step S201, and continues the same processing on the servo-motors Mx to which the ID code setting have not yet been executed in the same manner.

At which time the controller 21 determines that the ID code setting has been completed for all of the servo-motors M1 to M5 (step S201, Yes), the ID code setting processing at the controller 21 according to FIG. 6 is ended.

Figure 7:
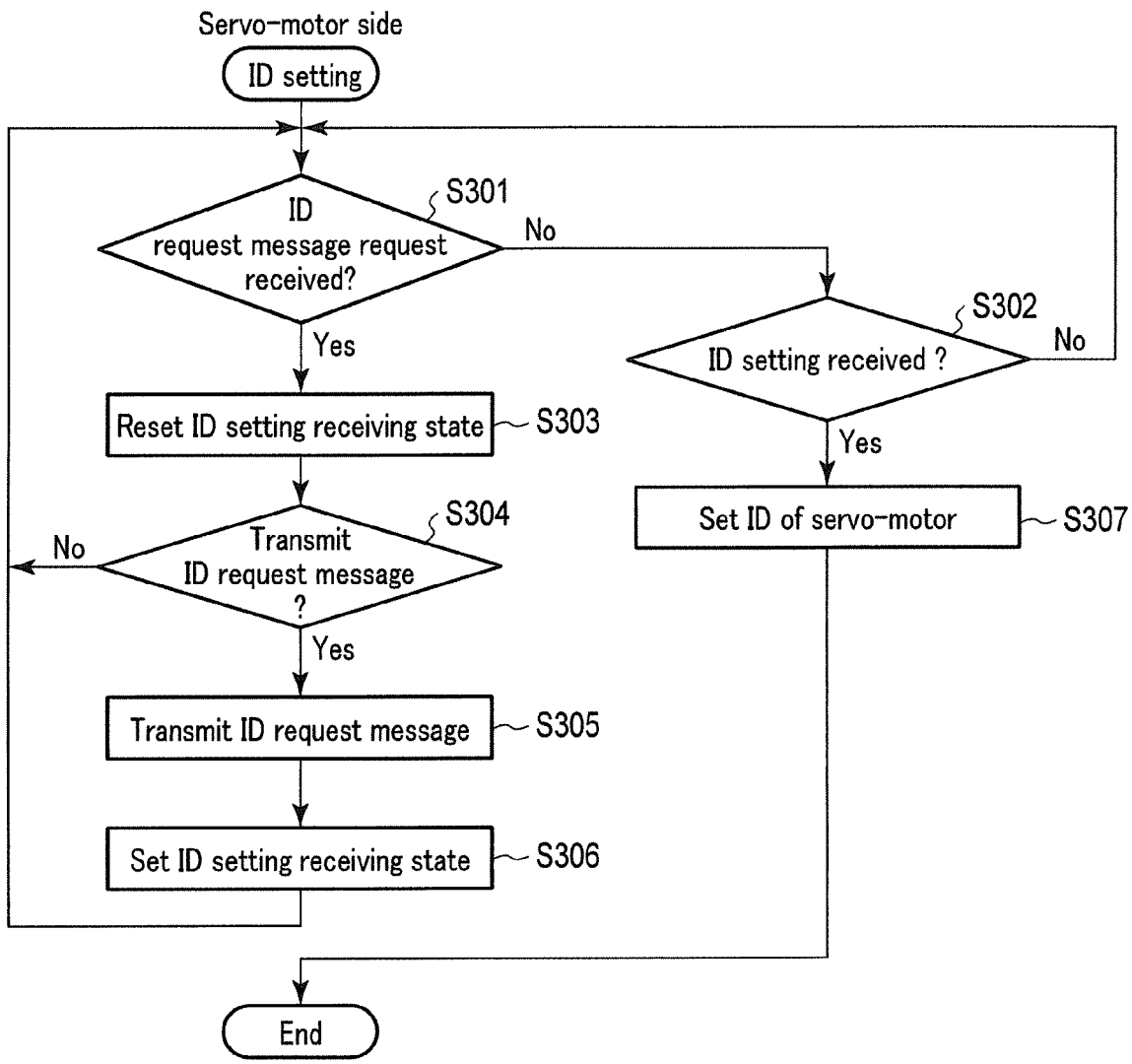
FIG. 7 is a flowchart showing processing content of the ID code setting at a servo-motor side according to the embodiment.

FIG. 7 is a flowchart showing the processing content during which the ID code is being set in the first stage above at each servo-motors M1 to M5. In the following, the processing will be explained as being performed at the servo-motor Mx.

The servo-motor Mx determines whether or not the "ID request message request" has been received from the controller 21 upon ID setting through the serial bus SB (step S301). In the case where it is determined that the "ID request message request" has not been received (step S301, No), subsequently, the servo-motor Mx determines whether or not it is in a receiving state of the ID code setting at that point, and has received the ID code setting through the serial bus SB (step S302).

In the case where it is determined as not being in the ID code setting receiving state, or as not receiving the ID code setting through the serial bus SB even when being in the ID code setting receiving state (step S302, No), the servo-motor Mx returns again to the processing from step S301.

In this manner, while repeatedly executing the processing of steps S301 and S302, the servo-motor Mx receives the "ID request message request" or waits to receive the ID code setting in the ID code setting receiving state.

In step S301, in the case where it is determined that the "ID request message request" is received (step S301, Yes), the servo-motor Mx resets the ID code setting receiving state at that time (step S303), and determines whether or not to transmit the "ID request message" to the controller 21 (step S304).

As mentioned above, at the servo-motor Mx, whether or not to respond to the message from the controller 21 is a matter that is randomly selected. Here, in the case of determining not to respond to the "ID request message request" from the controller 21, and not to transmit the "ID request message" (step S304, No), the servo-motor Mx returns to the processing from step S301.

Furthermore, in step S304, in the case of determining to respond to the "ID request message request" from the controller 21, and to transmit the "ID request message" (step S304, Yes), the servo-motor Mx transmits the "ID request message" shown in FIG. 5 anew to the controller 21 through the serial bus SB (step S305), sets the ID code setting receiving state (step S306), returns to the processing from step S301 again, and waits for the ID code to be set to be transmitted from the controller 21.

In step S302, in the case where it is determined as being in the ID code setting receiving state, and as receiving the ID code setting through the serial bus SB (step S302, Yes), the servo-motor Mx stores the ID code received from the controller 21 in the memory section therein (step S306), and ends the ID code setting processing at the servo-motor Mx according to FIG. 7.

As the second stage, an operation will be explained for a case in which, from a state where each randomly occurred unique ID code has been set for all of the servo-motors M1 to M5, the servo-motors M1 to M5 are detected as to which part of the robot they correspond to, and are stored by having information indicating the detected position corresponded to the ID code.

FIG. 8 shows a case in which the robot 10 is placed, for example, on a desk board BD on its back. In the state of FIG. 8, the acceleration sensor AC is arranged at approximately the center inside the torso part 12 in the manner shown by the dotted line. By operating one of the servo-motors M1 to M5 by a preset certain amount, from the change of behavior generated at the robot 10, a part of the servo-motor in the robot 10 that has been driven at that point may be determined.

FIG. 9 is a flowchart showing the processing contents executed by the controller 21 at the second stage from the state shown in FIG. 8.

At first, the controller 21 confirms that the setting at the second stage has not been ended depending on whether or not there is at least one servo-motor Mx whose position is undetected (step S401).

When there is at least one servo-motor Mx whose position is undetected, and it is determined that the setting at the second stage has not be ended (step S401, Yes), the controller 21 selects one servo-motor Mx whose position is undetected and designates its ID code. The controller 21 then, for example, transmits an instruction signal for rotating and driving a motor angle 20° from −10° to (+10°) from the current state, and for subsequently returning the angle to the original state of 0° (step S402).

At the same time, the controller 21 occasionally measures the three-axis acceleration data from the acceleration sensor AC to acquire the change on how the tilt of the robot 10 has changed over time (step S403).

The controller 21 compares a pattern of data series obtained over time from the acceleration sensor AC with the pattern data for each part that is stored in advance, and calculates each of the degree of similarity with the pattern data of each of the parts to determine the part with the highest similarity as the part in which the servo-motor Mx is arranged (step S404).

Information regarding the determined part is recorded and set by being corresponded to the ID code of the servo-motor Mx (step S405).

In the above manner, the processing regarding detection and setting of a part with respect to one servo-motor Mx is determined as being ended, and returns again to the processing from step S401.

By repeatedly executing the processing of steps S401 to S405 for the number of servo-motors M1 to M5 in the above manner, all of the parts of the servo-motors M1 to M5 can be corresponded to each ID code and recorded.

Subsequently, in step S401, when it is determined that there are no more servo-motors Mx with undetected positions in the state where the recording and setting have ended for all of the servo-motors M1 to M5 (step S401, No), the processing in FIG. 9 and the second stage are ended, thereby, completing the initial setting at the robot 10.

According to the present embodiment explained in detail above, it is possible to efficiently implement the initial setting of a plurality of servo-motors connected through a common signal line.

Furthermore, in the present embodiment, since ID codes for identifying each of the servo-motors M1 to M5 are each set based on the occurred random value, the load on processing can be reduced by reducing the time for the controller 21 side to create an ID code with respect to the control target.

In this case, by storing ID codes set to the servo-motors M1 to M5 each time at the controller 21 side, and storing them in correspondence to the parts detected in the later stage, the initial setting can be efficiently executed.

Although it is not explained in the above embodiment, not only upon the above initial setting, but also upon normal operation after the initial setting is completed, by packetizing control data that includes the ID code of when the controller 21 instructs operations to each of the servo-motors M1 to M5 through the serial bus SB and transmitting it to the serial bus SB, reception data may be handled easily at the servo-motors M1 to M5 side that receives the instruction.

In the above embodiment, each part of the servo-motors M1 to M5 is explained as being detected based on a calculation result at the acceleration sensor AC in the second stage of the initial setting. However, the part being operated can be detected with further accuracy by allowing the operation of each of the servo-motors M1 to M5 included in the robot 10 to be detected not only by the acceleration sensor AC, but also by the change in, for example, an angular velocity using a Gyro sensor, a voice signal collected by a microphone MC by physical interference, etc. of a driving sound of a motor or a surrounding environment, etc., or a surrounding assuming that the robot 10 further includes an imaging system including an image sensor, or a video signal of an operation of the robot 10 itself by a mirror arranged opposite to the robot 10, and collectively determining such various types of signals.

Furthermore, as explained above, in a further high-ranking robot imitating some kind of creature, the initial setting would become complicated due to including numerous flexibilities (drive sections). Therefore, by adopting the processing carried out upon the initial setting as set forth in the present embodiment, the necessary time and labor can be significantly simplified.

The present invention is not limited to the above embodiment, and can be modified in various manners in practice when implementing the invention without departing from the gist of the invention. Moreover, the embodiments may be implemented by being suitably combined to a maximum extent, in which case a combined effect can be obtained. Furthermore, the above embodiments include inventions in various stages, and a variety of inventions can be derived by suitably combining structural elements disclosed in connection with the embodiments. For example, even if some structural elements are deleted from the entire structural elements mentioned in the embodiments, in the case where the problem described in the problem to be solved can be solved and the effect described in the effect of the invention can be achieved, the structure from which the structural elements are deleted can be extracted as an invention.

What is claimed is:

1. A driving device comprising:
a controller;
a plurality of servo-motors connected to the controller through a common signal line; and
a plurality of drive sections driven by the servo-motors, respectively,
wherein each of the servo-motors includes:
a first storage section storing identification information that differ from each other;
an identification information generation unit that causes a random value to be created, and generates the created random value as the identification information;
a first storage controller that stores the identification information created by the identification information generation unit in the first storage section;
a second transmission unit that transmits the identification information created by the identification information generation unit to the controller through the common signal line; and
a drive controller that causes the servo-motor to operate in a case where identification information transmitted to the common signal line by the controller and the identification information stored in the first storage section match, and
wherein the controller includes:
a first transmission unit that transmits identification information designating one servo-motor from among the servo-motors to the common signal line;
an operation detection unit that detects an operation aspect of the driving device that is caused by a movement of the drive section driven by the servo-motor, among the servo-motors, which is operated by the drive controller based on the identification information transmitted by the first transmission unit to the common signal line; and
a correspondence information generation unit that creates correspondence information indicating which servo-motor among the servo-motors the identification information transmitted by the first transmission unit corresponds to, based on the operation aspect detected by the operation detection unit.

2. The driving device according to claim 1, wherein the controller further comprises a second storage section that receives and stores identification information transmitted by each of the servo-motors.

3. The driving device according to claim 1, wherein the operation detection unit detects an operation aspect of the driving device that is caused by an movement of the driving section driven by the servo-motor, by at least one of acceleration, angular velocity, voice, and video.

4. The driving device according to claim 1, wherein the driving device is a robot, and the drive sections are at least one of a head part, a cervical part, and extremity parts with respect to a torso part imitating a creature.

5. The driving device according to claim 2, wherein the controller further comprises a packet data generation unit that generates packet data including identification information and operation information for operating the servo-motor, based on one of the identification information stored in the second storage section.

6. The driving device according to claim 4, wherein
the servo-motor is arranged at one of the head part, the cervical part, and the extremity parts, and
the correspondence information generation unit creates correspondence information indicating a servo-motor arranged at which part the identification information transmitted by the first transmission unit corresponds to, based on the operation aspect detected by the operation detection unit.

7. A control method of a controller in a driving device, the driving device including the controller, a plurality of servo-motors connected to the controller through a common signal line, and provided with a first storage section storing each different identification information, an identification information generation unit that causes a random value to be created, and generates the created random value as the identification information, a first storage controller that stores the identification information created by the identification information generation unit in the first storage section, a second transmission unit that transmits the identification information created by the identification information generation unit to the controller through the common signal line, and a driving controller operating the servo-motor in a case where identification information transmitted by the controller to the common signal line matches the identification information stored in the first storage section, and a plurality of drive sections driven by the servo-motors, respectively, the control method comprising:
performing first transmission to transmit identification information designating one servo-motor from among the servo-motors to the common signal line;
performing operation detection to detect an operation aspect of the driving device that is caused by a movement of the drive section driven by the servo-motor, among the servo-motors, which is operated by the drive controller based on the identification information transmitted by the first transmission to the common signal line; and
performing correspondence information generation to create correspondence information indicating which servo-motor among the servo-motors the identification information transmitted by the first transmission corresponds to, based on the operation aspect detected by the operation detection.

8. The control method according to claim 7, wherein the controller is further provided with a second storage section that receives and stores identification information transmitted by each of the servo-motors.

9. The control method according to claim 8, further comprising performing packet data generation to create packet data including identification information and operation information for operating the servo-motor, based on one of identification information stored in the second storage section.

10. The control method according to claim 7, wherein the operation detection includes detecting an operation aspect of the driving device that is caused by a movement of the drive section driven by the servo-motor, by at least one of acceleration, angular velocity, voice, and video.

11. The control method according to claim 7, wherein the driving device is a robot, and the drive sections form at least one of a head part, a cervical part, and extremity parts with respect to a torso part imitating a creature.

12. The control method according to claim 11, wherein
the servo-motor is arranged at one of the head part, the cervical part, and the extremity parts, and
the correspondence information generation includes creating correspondence information indicating which servo-motor arranged at which part the identification information transmitted by the first transmission corresponds to, based on the operation aspect detected by the operation detection.

13. A non-transitory computer-readable storage medium having stored thereon a program for a controller in a driving device, the driving device including the controller, a plurality of servo-motors connected to the controller through a common signal line, and provided with a first storage section storing each different identification information, an identification information generation unit that causes a random value to be created, and generates the created random value as the identification information, a first storage controller that stores the identification information created by the identification information generation unit in the first storage section, a second transmission unit that transmits the identification information created by the identification information generation unit to the controller through the common signal line, and a driving controller operating the servo-motor in a case where identification information transmitted by the controller to the common signal line matches the identification information stored in the first storage section, and a plurality of drive sections driven by the servo-motors, respectively, the program causing the controller to function as:
a first transmission unit that transmits identification information designating one servo-motor from among the servo-motors to the common signal line;
an operation detection unit that detects an operation aspect of the driving device that is caused by a movement of the drive section driven by the servo-motor, among the servo-motors, which is operated by the drive controller based on the identification information transmitted by the first transmission unit to the common signal line; and
a correspondence information generation unit that creates correspondence information indicating which servo-motor among the servo-motors the identification information transmitted by the first transmission unit corresponds to, based on the operation aspect detected by the operation detection unit.

* * * * *